(12) United States Patent
Reed et al.

(10) Patent No.: US 8,465,630 B2
(45) Date of Patent: Jun. 18, 2013

(54) OXYGEN SEPARATION ASSEMBLY AND METHOD

(75) Inventors: David M. Reed, East Amherst, NY (US); David Frisbee Suggs, Eggertsville, NY (US); Michael J. Collins, Lockport, NY (US); Richard Martin Kelly, Buffalo, NY (US); Gervase Maxwell Christie, Williamsville, NY (US)

(73) Assignee: Praxair Technology, Inc., Danbury, CT (US)

( * ) Notice: Subject to any disclaimer, the term of this patent is extended or adjusted under 35 U.S.C. 154(b) by 521 days.

(21) Appl. No.: 12/607,092

(22) Filed: Oct. 28, 2009

(65) Prior Publication Data

US 2010/0116680 A1    May 13, 2010

Related U.S. Application Data

(63) Continuation-in-part of application No. 12/267,801, filed on Nov. 10, 2008.

(51) Int. Cl.
*C25B 9/00* (2006.01)
*C25B 13/00* (2006.01)

(52) U.S. Cl.
USPC ........... 204/260; 204/266; 204/252; 204/262; 204/263; 205/344

(58) Field of Classification Search
USPC .................................. 205/633–634
See application file for complete search history.

(56) References Cited

U.S. PATENT DOCUMENTS

| | | | | |
|---|---|---|---|---|
| 3,282,803 A | * | 11/1966 | Poepel et al. | 436/34 |
| 3,393,249 A | * | 7/1968 | Fox et al. | 585/323 |
| 3,658,685 A | * | 4/1972 | Childs et al. | 204/284 |
| 5,169,506 A | * | 12/1992 | Michaels | 204/242 |
| 5,302,258 A | | 4/1994 | Renlund et al. | |
| 5,338,623 A | | 8/1994 | Nachlas et al. | |
| 5,750,279 A | | 5/1998 | Carolan et al. | |
| 5,985,113 A | | 11/1999 | Crome et al. | |
| 6,042,703 A | | 3/2000 | Adler et al. | |
| 6,090,265 A | | 7/2000 | Adler et al. | |
| 6,132,573 A | | 10/2000 | Cubukcu et al. | |
| 6,194,335 B1 | | 2/2001 | Crome et al. | |
| 6,592,731 B1 | * | 7/2003 | Lawless | 204/425 |
| 2005/0058871 A1 | * | 3/2005 | Li et al. | 429/30 |
| 2005/0147857 A1 | | 7/2005 | Crumm et al. | |
| 2005/0258031 A1 | | 11/2005 | Chandran et al. | |
| 2005/0263405 A1 | * | 12/2005 | Jacobson et al. | 205/619 |
| 2006/0175194 A1 | | 8/2006 | Bagby et al. | |

FOREIGN PATENT DOCUMENTS

WO      WO 01/24300 A1     4/2001
WO      WO 2009/079119 A1  6/2009

* cited by examiner

*Primary Examiner* — Nicholas A Smith
*Assistant Examiner* — Brian W Cohen
(74) *Attorney, Agent, or Firm* — David M. Rosenblum

(57) ABSTRACT

An electrically driven oxygen separation assembly and method for applying an electrical potential in which the assembly has one or more tubular membrane elements. The potential is applied at two central spaced locations of a tubular membrane element and at least at opposite end locations thereof. As a result the electric current flow through the tubular membrane element is divided into two parts flowing between the two central spaced locations and the opposite end locations. Additionally, the present invention also provides an end seal to be used in connection with tubular membrane elements.

4 Claims, 4 Drawing Sheets

OXYGEN SEPARATION ASSEMBLY AND METHOD

RELATED APPLICATIONS

This application is a continuation-in-part of U.S. patent application Ser. No. 12/267,801 filed Nov. 10, 2008.

FIELD OF THE INVENTION

The present invention relates to an electrically driven oxygen separation assembly and method in which the oxygen is separated with the use of one or more tubular membrane elements of the assembly. More particularly the present invention relates to such an oxygen separation assembly and method in which the electrical potential is applied at opposed electrodes of the tubular membrane element or elements at two central spaced locations and at least at two end locations of the tubular membrane element outwardly spaced from the two central spaced locations.

BACKGROUND OF THE INVENTION

Electrically driven oxygen separators are used to separate oxygen from oxygen containing feed, for example, air. Additionally, such devices are also used in purification application where it is desired to purify an oxygen containing feed by separating oxygen from the feed. Electrically driven oxygen separators can utilize tubular membrane elements having a layered structure containing an electrolyte layer capable of transporting oxygen ions when subjected to an elevated temperature, cathode and anode electrode layers located at opposite surfaces of the electrolyte layer and current collector layers to supply an electrical current to the cathode and anode electrode layers.

When the tubular membrane elements are subjected to the elevated temperature, the oxygen contained in a feed will ionize on one surface of the electrolyte layer, adjacent the cathode electrode layer by gaining electrons from an applied electrical potential. Under the impetus of the applied electrical potential, the resulting oxygen ions will be transported through the electrolyte layer to the opposite side, adjacent the anode layer and recombine into elemental oxygen.

The tubular membrane elements are housed in an electrically heated containment to heat the tubular membrane elements to an operational temperature at which oxygen ions will be transported. Additionally, such tubular membrane elements can be manifolded together such that the oxygen containing feed is passed into the heated containment and the separated oxygen is withdrawn from the tubular membrane elements through a manifold. In certain purification applications, the oxygen containing feed can be passed through the interior of the tubular membrane elements and the separated oxygen can be withdrawn from the containment.

Typical materials that are used to form the electrolyte layer are yttrium or scandium stabilized zirconia and gadolinium doped ceria. The electrode layers can be made of mixtures of the electrolyte material and a conductive metal, a metal alloy or oxide such as an electrically conductive perovskite. Current collectors in the art have been formed of conductive metals and metal alloys, such as silver as well as mixtures of such metals and metallic oxides.

In order to apply the electrical potential to the tubular membrane elements, conductors can be attached to the current collector layers. Such conductors are attached at single locations to connect the tubular membrane elements in a series or parallel electrical connection. The problem with this is that the electrical current is unevenly distributed throughout the length of each of tubular elements resulting in hot spots developing at the connection of the conductors to the tubular membrane elements. Such hot spots can lead to failure of the tubular elements. Ideally the current is distributed evenly along the length of the current collector resulting in an even temperature distribution and localized oxygen ion flow along the length of the membrane. Since the distribution of the electrical current is uneven, ionic conduction of the oxygen ions through the electrolyte layer is also uneven in that it occurs, to a large extent, at the connection of the conductors to the current collection layers.

A yet further problem is that the tubular membrane elements project through insulators and/or the heated containment that can also be insulated. Thus, at the projecting ends of the tubular membrane elements, a temperature is produced that is about 500° C. less than the temperature of the tubular elements within the heated containment that can be about 700° C. At these temperature transition zones it has been found that the electrolyte layer can undergo a chemical reduction in which the electrode chemically reduces into an electronic conductor leading to another point at which the tubular membrane elements will fail over time.

As will be discussed, the present invention provides an oxygen separation assembly that utilizes one or more tubular membrane elements and a related method in which, among other advantages, the current is more evenly distributed along the length of the tubular membrane elements as compared with prior art. Further each of the tubular elements can be modified to resist failure in the temperature transition zone as discussed above. Furthermore, the ends of the tubular membrane elements can be sealed with a plug-like member in a cost effective manner.

SUMMARY OF THE INVENTION

The present invention provides, in one aspect, an electrically driven oxygen separation assembly. In accordance with this aspect of the present invention, at least one tubular membrane element is provided having an anode layer, a cathode layer, an electrolyte layer located between the anode layer and the cathode layer and two current collector layers located adjacent to and in contact with the anode layer and the cathode layer and situated on the inside and outside of the at least one tubular membrane element. The two current collector layers allow an electrical current to be applied by a power source to the electrode layers to in turn induce oxygen ion transport through the electrolyte layer from the cathode layer to the anode layer. A set of conductors are connected to one of the two current collector layers at two central spaced locations of the at least one tubular membrane element and to the other of the two current collector layers at least at opposite end locations of the at least one tubular membrane element, outwardly spaced from the two central spaced locations, so that the power source is able to apply the electrical current through the set of conductors between the two central spaced locations and at least the two opposite end locations. As a result, the electrical current flowing through the at least one tubular membrane element is divided into two parts flowing between the two central spaced locations and the opposite end locations.

The division of the electrical current allows the electrical current to be more evenly distributed throughout the tubular membrane element to prevent hot spots from developing and leading to failure of the tubular membrane element. Additionally, the even distribution of the electrical current allows more of the tubular membrane element to be used efficiently in separating the oxygen.

The one of the two current collector layers can be situated on the outside of the at least one tubular membrane element with the cathode layer being adjacent to the one of the two current collector layers. Outer, opposed end sections of the at least one tubular membrane element can be retained within insulation members and the cathode layer and the one of the two current collector layers partially extend along a length dimension of the at least one tubular membrane element such that the outer, opposed end sections of the at least one tubular membrane element are devoid of at least the cathode layer and the one of the two current collector layers. The end sections could also be devoid of the anode layer and the other of the two current collector layers. It is to be noted here that since the outer, opposed end sections are retained within insulation members, there is a temperature transition zone within the end sections as discussed above. However, since there is no cathode layer and as will be discussed, also possibly no anode layer there is no electrical current being conducted in this region leading to a chemical reduction of the electrolyte and a possible failure thereof. In this regard, it is to be noted that the "two opposite end locations" do not have to be located at the physical ends of the at least one tubular membrane element and under circumstances in which there is no anode layer, such locations should be inwardly spaced from such physical ends so as to lie outside of the insulation members.

A current distributor of elongated configuration can be located within the at least one tubular membrane element, extending between the ends of the at least one tubular membrane element and in contact with the other of the two current collectors at a plurality of points situated within the tubular membrane elements. The conductors connected to the opposite end locations of the tubular membrane elements are connected to opposite ends of the current distributor. The current distributor can be of helical configuration.

The at least one tubular membrane element can be provided with opposed end seals, opposed, sealed electrical feed-throughs penetrating the opposed end seals and an outlet tube penetrating one of the opposed end seals to discharge oxygen. The conductors connected to the at least one tubular membrane element at the two opposite end locations pass through electrical feed-throughs and are connected to the current distributor.

The at least one tubular membrane element can be a plurality of tubular membrane elements. The plurality of tubular membrane elements can be electrically connected in series by the set of the conductors with a first pair of the conductors connected to the two central spaced locations of a first of the tubular membrane elements, a second pair of the conductors connected to the opposite end locations of a second of the tubular membrane elements and remaining pairs of the conductors linking pairs of remaining tubular membrane elements at the two central spaced locations and at least the opposite end locations thereof so that the first pair of conductors and the second pair of conductors are able to be connected to an electrical power source.

The one of the two current collectors can be situated on the outside of each of the tubular membrane elements adjacent the cathode layer and the other of the two current collectors can be situated on the inside of the tubular membrane elements adjacent the anode layer.

The tubular membrane elements can be arranged in a bundle and held in a radial array by opposed insulation members located at outer, opposite end sections of the tubular membrane elements. The tubular membrane elements can be provided with opposed end seals, opposed, sealed electrical feed-throughs penetrating the opposed end seals and outlet tubes penetrating the opposed end seals at one end of the bundle to discharge the oxygen. The conductors connected to the tubular membrane elements at the two opposite end locations pass through electrical feed-throughs and are in electrical contact with the other of the two current collectors. A manifold is connected to the outlet tube and has a common outlet to discharge the oxygen that is discharged from the outlet tube. The cathode layer and the one of the two current collector layers can partially extend along a length dimension of the tubular membrane elements such that the outer, opposed end sections of the tubular membrane elements are devoid of at least the cathode layer and the one of the two current collector layers. The end sections could also be devoid of the anode layer and the other of the two current collector layers. As indicated above, a current distributor can be employed with the conductors connected to the opposite end locations of the tubular membrane elements being connected to opposite ends of the current distributor. The current distributor can be of helical configuration.

In another aspect, the present invention provides a method of applying an electric potential in an electrically driven oxygen separation assembly. In accordance with this aspect of the present invention the electric potential is applied to at least one tubular membrane element having an anode layer, a cathode layer, an electrolyte layer formed of the electrolyte material and located between the anode layer and the cathode layer and two current collector layers located adjacent to and in contact with the anode layer and the cathode layer and situated on the inside and outside of the at least one tubular membrane element. The electric potential is applied to one of the two current collector layers at two central spaced locations of the at least one tubular membrane element and to the other of the two current collector layers at least at opposite end locations of the at least one tubular membrane element, outwardly spaced from the two central spaced locations, so that an electrical current flowing through the at least one tubular membrane element, induced by the applied electric potential, is divided into two parts flowing between the two central spaced locations and the opposite end locations.

The one of the two current collector layers is located on the outside of the tubular membrane element. The cathode is located adjacent the one of the two current collector layers and the oxygen containing feed contacts the outside of the tubular membrane element. The oxygen is collected on the inside of the tubular membrane element and is withdrawn from the inside of the tubular membrane element. As indicated above, the cathode layer and the one of the two current collector layers can partially extend along a length dimension of the tubular membrane element such that outer, opposed end sections of the tubular membrane element are devoid of at least the cathode layer and the one of the two current collector layers located adjacent to the at least one of the cathode layer. In this regard, the end sections, as indicated above could be devoid of the anode layer and the other of the two current collector layers as well. The current can be applied to the other of the current collectors at a plurality of points situated within the tubular membrane element between the end locations thereof.

In yet another aspect, the present invention provides a tubular membrane element for electrically driven oxygen separation in which the tubular membrane element comprises an anode layer, a cathode layer, an electrolyte layer located between the anode layer and the cathode layer and two current collector layers located adjacent to and in contact with the anode layer and the cathode layer. The two current collector layers are situated on the inside and outside of the tubular membrane element to allow an electrical potential to be applied by a power source to induce oxygen ion transport through the electrolyte layer from the cathode layer to the anode layer.

End seals are located at opposite ends of the tubular membrane element. Each of the end seals comprising a plug-like member located within the tubular membrane element and formed by an elastomer to produce a hermetic seal and means for retaining the plug-like member within the tubular membrane element. At least one sealed electrical feed-through penetrates at least one of the end seals and a set of electrical conductors pass through the at least one sealed electrical feed-through and in electrical contact with one of the two current collector layers situated on the inside of the tubular membrane element and are connected to the other of the two current collector layers situated on the outside of the tubular membrane element. An outlet tube penetrates the one of the end seals or the other of the end seals to allow oxygen to be discharged from the tubular membrane element.

The retaining means can be a deposit of a ceramic adhesive located within the tubular membrane element adjacent to the plug-like member and positioned to prevent outward movement of the plug-like member.

The at least one sealed electrical feed-through can be two opposed sealed electrical feed-throughs penetrating the end seals. The outlet tube can penetrate the one of the end seals and the set of electrical conductors comprises a first pair of the electrical conductors and a second pair of the electrical conductors. The first pair of the electrical conductors are connected to two spaced central locations of the other of the two current collector layers situated on the outside of the tubular membrane element and the second pair of the electrical conductors passing through the two opposed sealed electrical feed throughs. A current distributor of elongated configuration is located within each of the tubular membrane elements, extends between the ends of the tubular membrane element, contacts the one of the two current collector layers situated on the inside of the tubular membrane element and is connected, at opposite ends, to the second pair of the electrical conductors. The current distributor can be of helical configuration.

In still another aspect, the present invention provides an end seal for sealing an end of a tubular membrane element configured for electrically driven oxygen separation. The end seal comprises a plug-like member located within the tubular membrane element and formed by an elastomer to produce a hermetic seal and means for retaining the plug-like member within the tubular membrane element. The retaining means is a deposit of a ceramic adhesive located within the tubular membrane element adjacent to the plug-like member and positioned to prevent outward movement of the plug-like member. This end seal can be used in any embodiment of the present invention.

BRIEF DESCRIPTION OF THE DRAWINGS

While the specification concludes with claims that distinctly point out the subject matter that Applicants regard as their invention, it is believed that the invention will be understood when taken in connection with the accompanying drawings in which:

DETAILED DESCRIPTION

Figure 1:
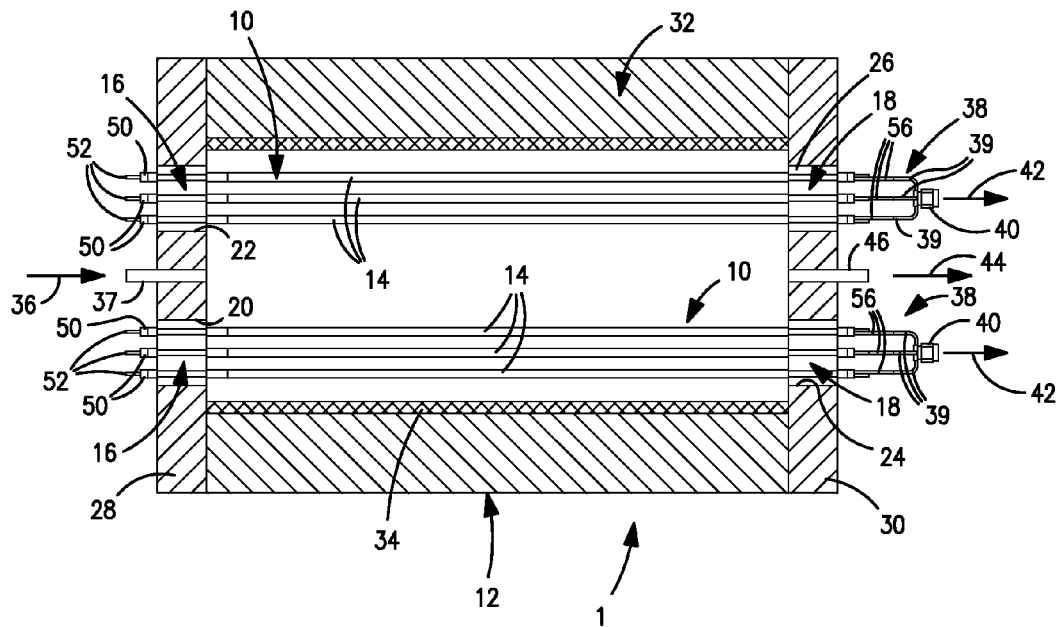
FIG. 1 is a schematic sectional view of bundles of tubular membrane elements of an electrically driven oxygen separation assembly in accordance with the present invention illustrated within a heated containment and with the electrical connections to such elements not shown.

With reference to FIG. 1, an oxygen separator 1 is illustrated that has oxygen separation assemblies 10 housed within a heated containment 12. Oxygen separation assemblies 10 are each formed by tubular membrane elements 14 that are held in a bundle-like position by end insulation members 16 and 18 that are fabricated from high purity alumina fiber. The tubular membrane elements for exemplary purposes can have an outer diameter of about 6.35 mm., a total wall thickness of about 0.5 mm. and a length of about 55 cm. The end insulation members 16 and 18 are retained within opposite openings 20, 22 and 24 and 26 defined in insulated end walls 28 and 30 of heated containment 12. Heated containment 12 can be of cylindrical configuration having an insulated sidewall 32 connecting the end walls 28 and 30. A heated insulation layer 34 is coaxially positioned within insulated sidewall 32 and contains heating elements to heat the tubular membrane elements 14 to an operational temperature at which oxygen ion transport will occur when an electrical potential is applied to such elements.

During operation of the oxygen separator 1, an oxygen containing feed stream 36 is introduced into the interior of heated containment 12 by way of an inlet 37 to contact the outside of the tubular membrane elements 14. By means of a potential applied to the tubular membrane elements 14, the oxygen is converted to oxygen ions that are transported to the interior of such elements 14. The separated oxygen is then discharged through manifold arrangements 38 having a spider-like arrangement of tubes 39 connected to a compression fitting 40 having bores (not illustrated) to receive oxygen streams from the tubes 39 and to discharge an oxygen stream 42 from the compression fittings 40. Although not illustrated, the compression fittings 40 could be connected to a common discharge pipe or other manifold to collect and discharge the separated oxygen. The oxygen depleted retentate is discharged as a retentate stream 44 from an outlet 46 of the heated containment 12.

Figure 2:
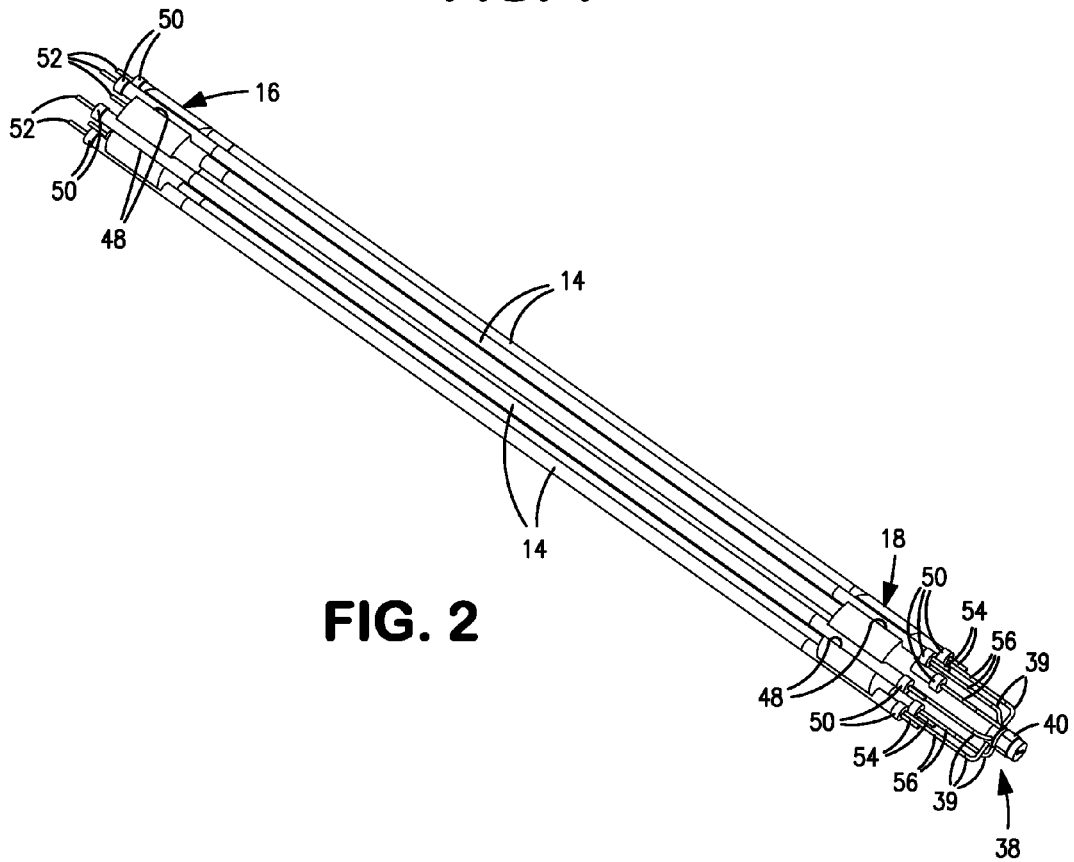
FIG. 2 is a perspective view of bundled tubular membrane elements utilized in FIG. 1.

With additional reference to FIG. 2, it can be seen that each of the end insulation members 16 and 18 is provided with slots 48 to hold the tubular membrane elements 14 in place. In the particular illustrated embodiment, each of the bundles consists of six of such tubular membrane elements 14. Each of the tubular membrane elements 14 are provided with end seals that are formed by end caps 50 located at opposite ends thereof. Electrical feed-throughs 52 and 54 penetrate the end caps 50. Additionally, outlet tubes 56 penetrate the end caps 50 at one end of the tubular membrane elements 14.

It is understood that the discussion of oxygen separator 1 is for illustrative purposes only and is not intended to be limiting on the application of the invention or the scope of the appended claims. In this regard, the present invention has application to an oxygen separator having a single tubular membrane element 14 or such a tubular membrane element 14 utilized for purposes other than in the production of oxygen. For example, the invention has applicability to a purifier that is used to remove oxygen from an oxygen containing feed stream and as such, the feed stream could be fed to the interior of tubular membrane elements.

Figure 3:
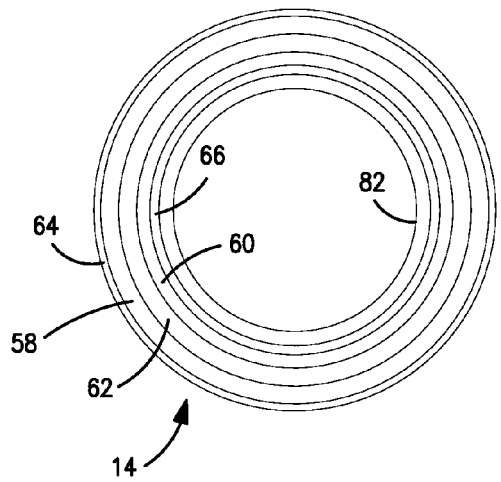
FIG. 3 is a schematic sectional view of a tubular composite membrane utilized in the tubular membrane elements illustrated in FIGS. 1 and 2.

With reference to FIG. 3, each tubular membrane element 14 is provided with a cathode layer 58, an anode layer 60 and an electrolyte layer 62. Two current collector layers 64 and 66 are located adjacent the anode layer 58 and the cathode layer 60, respectively, to conduct an electrical current to the anode layer and the cathode layer. Although the present invention has application to any composite structure making up a tubular membrane element 14, for exemplary purposes, the cathode layer 58 and the anode layer 60 can be between about 10 and about 50 microns thick and the electrolyte layer 62 can be between about 100 microns and about 1 mm. thick, with a preferred thickness of about 500 microns. The electrolyte layer 62 is gas impermeable and can be greater than about 95 percent dense and preferably greater than 99 percent dense. Each of the cathode layer 58 and the anode layer 60 can have a porosity of between about 30 percent and about 50 percent and can be formed from $(La_{0.8}Sr_{0.2})_{0.98}MnO_{3-\delta}$. The electrolyte layer 62 can be 6 mol % scandium doped zirconia. The current collector layers 64 and 66 can each be between about 50 and about 150 microns thick, have a porosity of between about 30 percent and about 50 percent and can be formed from a powder of silver particles having surface deposits of zirconium oxide. Such a powder can be produced by methods well known in the art, for example by wash-coating or mechanical alloying. For exemplary purposes, a silver powder, designated as FERRO 511000-02 powder, can be obtained from Ferro Corporation, Electronic Material Systems, 3900 South Clinton Avenue, South Plainfield, N.J. 07080 USA. The size of particles contained in such powder is between about 3 and about 10 microns in diameter and the particles have a low specific surface are of about $0.2 \ m^2/gram$. Zirconia surface deposits can be formed on such powder such that the zirconia accounts for about 0.25 percent of the weight of the coated particle.

During operation of the oxygen separator 1, the oxygen contained in oxygen containing feed stream 36 contacts the current collector layer 64 and permeates through pores thereof to the cathode layer 58 which as indicated above is also porous. The oxygen ionizes as a result of an electrical potential applied to the cathode and anode layers 58 and 60 at current collector layers 64 and 66. The resulting oxygen ions are transported through the electrolyte layer 62 under the driving force of applied potential and emerge at the side of the electrolyte layer 62 adjacent the anode layer 60 where electrons are gained to form elemental oxygen. The oxygen permeates through the pores of the anode layer 60 and the adjacent current collector 66 where the oxygen passes into the interior of the tubular membrane element 14.

It is to be noted, that although the cathode layer is located on the outside of the tubular membrane elements 14, it is possible to reverse the layers so that the anode layer were located on the outside of the tubular membrane elements 14 and the cathode layer were located on the inside. Such an embodiment would be used where the device were used as a purifier. In such case the oxygen containing feed would flow on the inside of the tubular membrane elements 14.

Figure 4:
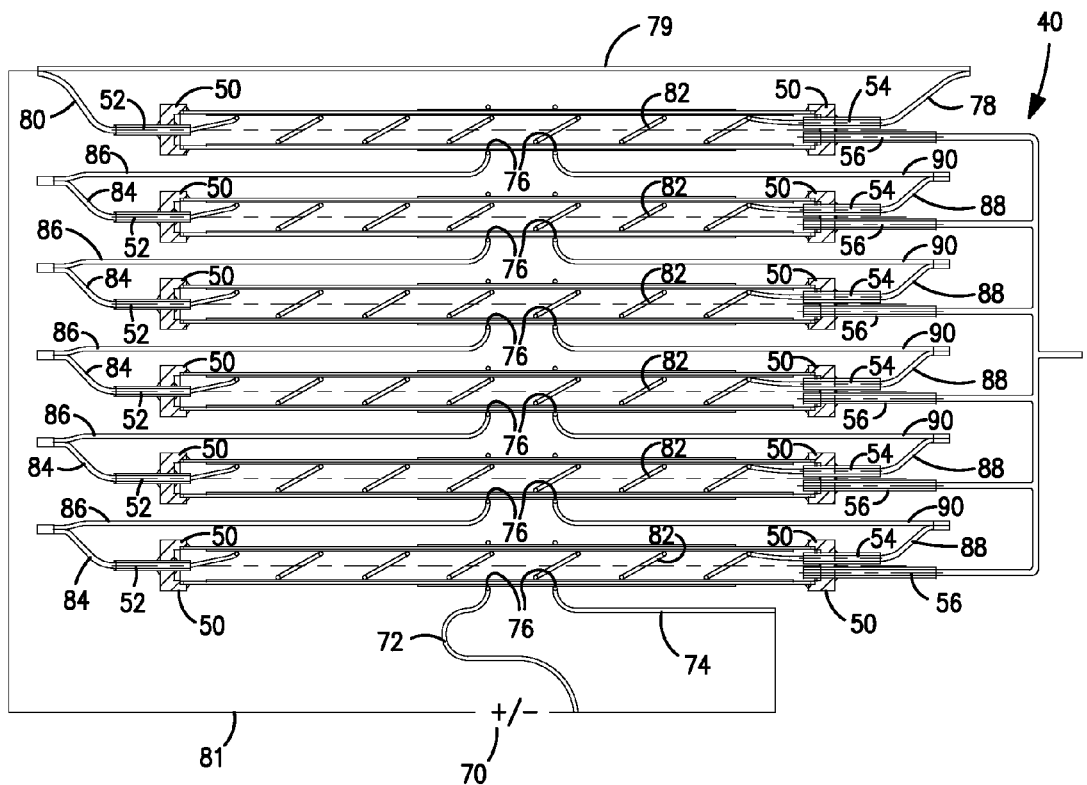
FIG. 4 is a fragmentary, schematic sectional view of an oxygen separation assembly utilized in FIG. 1 illustrating the electrical connection thereof to a power source.
Figure 5:
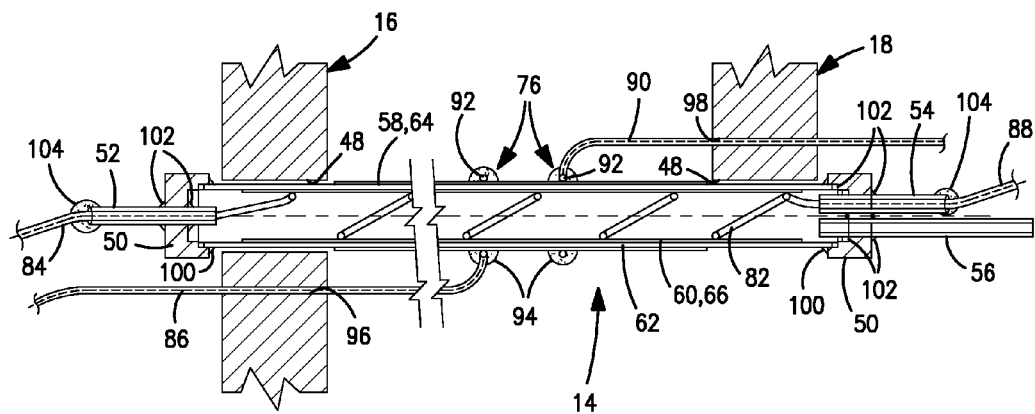
FIG. 5 is a schematic, sectional view of the electrical connection of composite membrane elements utilized in an oxygen separation assembly shown in FIG. 1.

With additional reference to FIGS. 4 and 5, the electrical potential, generated by a power source 70, can be applied to the tubular membrane elements 14 by means of a set of conductors that are formed from wires, preferably silver. A first pair of the conductors 72 and 74 is connected to the two central spaced locations 76 of a first of the tubular membrane elements 14 at the current collector layer 64 and to the negative pole of the power source 70. A second pair of the conductors 78 and 80 connect the anode layer 60 of a last of the tubular membrane elements 14 to the positive pole of the electrical power source by means of a silver wire 79 that joins conductor 78 and 80 and a wire 81 that is connected to the positive pole of electrical power source 70. The second pair of conductors 78 and 80 is in electrical contact with current collector layer 66 adjacent the anode layer 60, preferably at several points of contact, by means of a connection to opposite ends of a current distributor 82, more clearly shown in FIG. 4., that can be of helical configuration and thus formed from a length of silver wire that is spirally wound into the helical configuration. Remaining pairs of conductors formed by insulated wires 84, 86 and 88, 90 link pairs of remaining tubular membrane elements 14 at the two central spaced locations 76 and to the ends of current distributors 80 employed within such tubular membrane elements 14. The resulting electrical connection is a series electrical connection. However, a parallel electrical connection is also possible. Further, as indicated above, only one of the tubular membrane elements 14 might be used in a particular device to which the present invention is employed and therefore, such embodiment would only utilize the first and second pairs of conductors 72, 74, 78 and 80.

With specific reference to FIG. 5, it is to be noted that for purposes of illustration, the cathode layer 58 and its associated current collector 64 are shown as a single element as well as the anode layer 60 and its associated current collector layer 66. As shown in FIG. 5, the two spaced central locations 76 are formed by looping wires 86 and 90, around the tubular membrane element 14 and holding the looped wires 92 in place by deposits of silver paste 94. Wires 96 and 98 then pass through bores 96 and 98 provided within insulation members 16 and 18, respectively. Although not illustrated, the wires 96 and 98 can be wrapped around the outside of the tubular membrane element 14 before being passed through the bores 96 and 98 to prevent them from sagging into other tubes. It is to be noted that the ends of each of the tubular membrane elements 14 are sealed by end caps 50 that are held in place by deposits 100 and the electrical feed-throughs 52 and 54 and the outlets 56 are all held in place by deposits 102. It is to be noted that the end caps 50 can be formed by pressed or injected molded zirconia and the deposits 100 and 102 can be formed from a glass sealing material system, either a lead boro-silicate system or a barium alumino-silicate system. It is to be that there are other possible ways to form the end seals. For example, the glass sealing material itself or a mixture of such material with an oxide could be placed in the ends of the tubes. Such material could then be fired and cooled to solidification. The wires 84 and 88 pass through electrical feed-throughs 52 and 54 which are in turn sealed by deposits 104 of a braze material, preferably 50 percent Ag, Cu, Zn, Sn, Ni composition.

As mentioned above, the two spaced central locations 76 of tubular membrane elements 14 provide for the electrical current induced in tubular membrane elements 14 to be distributed between the ends of such elements and the two spaced central locations 76 so that the current is more uniformly distributed along the length of the tubular membrane elements 14. As a result, the temperature distribution is more uniform and more oxygen ion transport takes place in each of the tubular membrane elements 14 than had the potential been applied at solely two end locations of each of the tubular membrane elements 14 as in the prior art.

It is to be noted that some advantage, though a lesser advantage than when the current distributor 82 is utilized, can be obtained by connecting the wires 84 and 90 at end locations of each of the tubular membrane elements 14 that are outwardly spaced from the two central locations 76. For reasons that will be discussed, such end locations are preferably inside the tubes at regions thereof that are not surrounded by the end insulators 16 and 18. A further point is that if the tubular membrane elements 14 were used for purification applications, the two spaced locations might be placed within such elements. Alternatively, in any embodiment of the present invention, the two spaced locations could be positioned adjacent to the anode layer 60.

In an example of typical operating conditions at a nominal operational temperature of 700° C., each of the tubular membrane elements is supplied with 1.1 volts, DC by a power supply rated to at least 6.6 volts. The resulting total current that flows through the entire circuit which includes the oxygen ion current through the electrolyte of the tubular membrane elements 14 which is about 22.5 amperes. Associated with this current is an oxygen flow of about 0.83 liters per tube or roughly 0.5 liters for the six tube bundle and out of the outlet 38 of the manifold 40.

Figure 6:
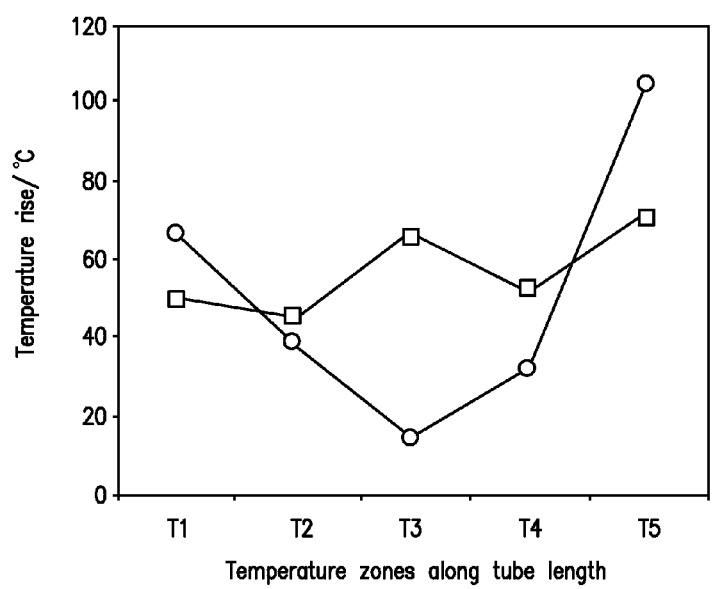
FIG. 6 is a graphical representation of the temperature profile along the length of a tubular membrane element of an oxygen separation assembly of the present invention compared with a tubular membrane element of an oxygen separation assembly of the prior art.

Approximately half of the electrical current, about 11.25 amperes flows through the series circuit created between one end of each of the tubular membrane elements 14 to one of the two spaced central locations 76 and the other half flows through the series circuit created at the other half of the tubular membrane elements 14 between the other of the two central locations and the other opposite end thereof. In this manner the current is distributed relatively uniformly across the length of the tubular membrane elements 14. This uniform current distribution is important because as each of the tubular membrane elements 14 heats as a result of the power dissipated during operation. With reference to FIG. 6, the temperature of a tubular membrane element was plotted where the electrical potential at the cathode was applied solely at the ends of the tube, close to the end caps 50 (the data presented in circles) and where the electrical potential at the cathode was applied at the central locations 76 (the data presented as squares). As is evident from the graph, the temperature rise and therefore the current distribution along the length of the tube are better managed by locating the conductors contacting the cathode at the center of the tubes.

As can be appreciated, the above description is for exemplary purposes only. For example, each of the tubular membrane elements could be 27.5 cm. Approximately twice as many elements would be used and the applied voltage to each such element would 1.1 volts at a current of 11.25 amperes. This lower operating current would allow for a longer longevity for each of the tubular membrane elements.

With continued reference to FIG. 5, it can be seen that the outer, opposite end sections of each of the tubular membrane elements are located within insulators 16, 18 that in turn are located within insulated end wall 28 and 30 of heated containment 12. As a result, there is essentially no oxygen transport taking place at such locations. At the same time, as indicated above, the temperature of each of the elements is increasing by about 500° C. As illustrated, the ends of each of the tubular membrane elements 14 are devoid of both the cathode layer 58 and its associated current collector 64 so that current does not flow within the tubular membrane elements 14 at such locations. It has been found that where the tubular membrane elements are designed with electrical current flow within such insulated end section, the ceramic will tend to undergo a chemical reduction reaction at such end sections with a consequent potential of a failure of the elements. It is to be noted, however, that advantageously, the anode layer 60 and its associated current collector layer 66 can also be dispensed with at such locations to ensure no current flow at the insulated ends of the tubular membrane elements. It is to be noted that embodiments of the present invention are possible in which the anode and cathode layers and their associated current collector layers extend to the physical ends of the tubular membrane elements 14 even when covered with an insulating member, but for reasons discussed above, this is not advisable.

As indicated above, embodiments of the present invention are possible without the current distributors 82. In such case, anode layer 60 and its associated current collector 66 could end at the insulator members 16 and 18 and the wires 84 and 88 would be connected inside the tubular membrane elements 14 inwardly of the ends thereof and of the end insulator members 16 and 18. As such, the end locations at which the potential would be applied would be inwardly spaced from the physical ends of the tubular membrane elements.

Figure 7:
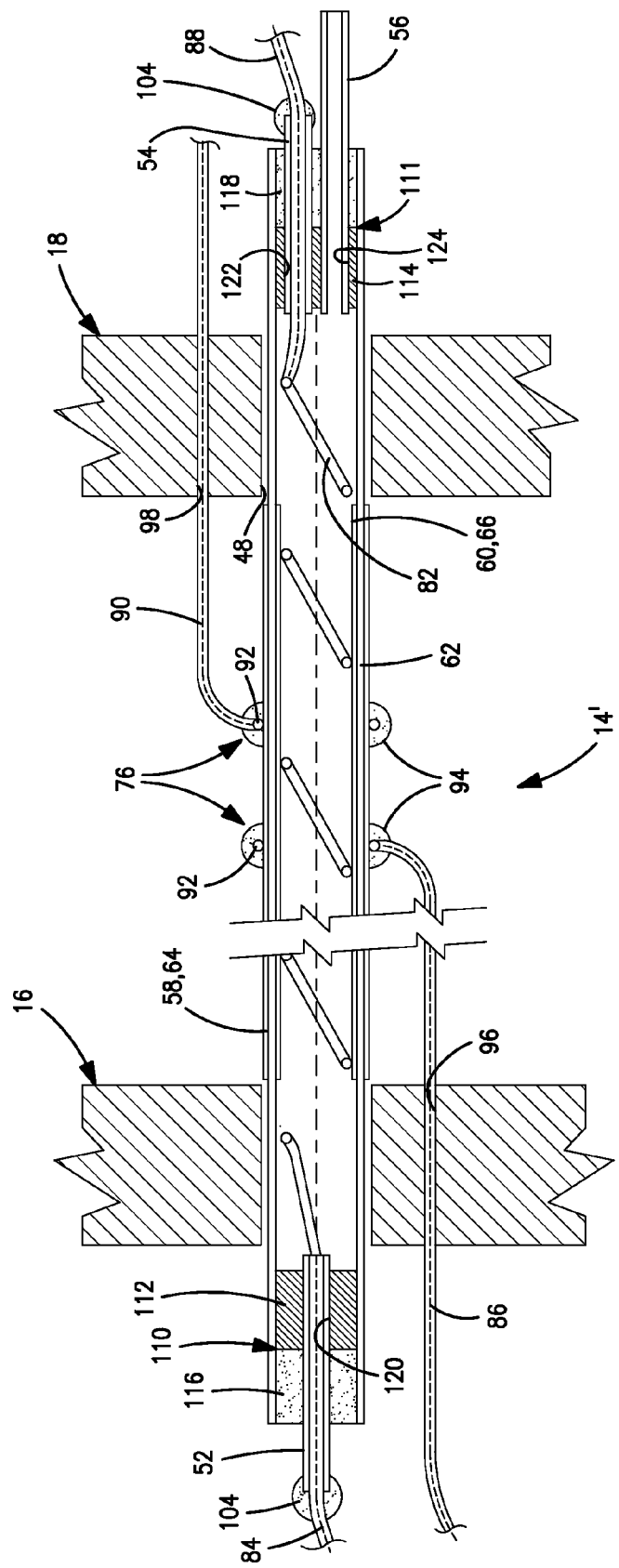
FIG. 7 is a schematic, section view of an alternative embodiment of tubular membrane element utilized in FIG. 1.

With reference to FIG. 7, a tubular membrane element 14' is illustrated that constitutes an alternative embodiment of the tubular membrane element 14 discussed above that incorporates end seals 110 in place of end caps 50 employed in the tubular membrane element 14. In order to avoid needless repetition of explanation, elements shown in FIG. 7 that have been described above with respect to tubular membrane element 14 have the same reference numbers. It is to be noted that in this particular embodiment, the outer opposed end sections of the tubular membrane element 14' within insulators 16 and 18 are devoid of both the cathode and anode layers 58 and 60 at current collector layers 64 and 66. As indicated above, it is possible to construct tubular membrane element 14 in a like manner or, on the other hand, construct tubular membrane element 14' in the manner specifically illustrated in the drawings for tubular membrane element 14, although less preferred.

The end seals 110 and 111 are formed by plug-like members 112 and 114 that are each fabricated from an elastomer to effect a hermetic seal at the ends of the tubular membrane element 14'. A suitable elastomer is a VITON® fluoroelastomer obtained through Dupont Performance Elastomers of Willmington, Del., United States of America.

During operation of tubular membrane element 14', oxygen will accumulate and will tend to force the plug-like members 112 and 114 in an outward direction and from the ends of tubular membrane element 14'. In order to retain the plug-like members 112 and 114 within the end of tubular membrane element 14', deposits of a ceramic adhesive 116 and 118 are introduced into the ends of tubular membrane element 14' at a location adjacent to plug-like member 112 and plug-like member 114, respectively. A suitable ceramic adhesive can be a RESBOND™ 940 fast setting adhesive manufactured by Cotronics Corporation of Brooklyn, N.Y., United States of America. It is to be noted that other suitable means to retain plug-like member 112 and 114 could be employed such as mechanical keys located adjacent to plug-like member 112 that penetrate opposed transverse bores defined at the ends of tubular membrane element 14' or sleeves cemented in place within the ends of tubular membrane element 14'.

As illustrated, electrical feed throughs 52 and 54 penetrate each deposits 116 and 118, respectively and plug-like members 112 and 114, respectively. In this regard an axial bore 120 is defined within plug-like member 112 for penetration of electrical feed through 52 and a bore 122 is defined within plug-like member 114 for penetration of electrical feed through 52. Additionally, outlet 56 penetrates plug-like member 114 and a bore 124 is provided for such purposes.

In order to install plug-like members 112 and 114 within the end of tubular membrane element 14', the same is fabricated with a larger outer diameter than the inner diameter of tubular membrane element 14' and then cooled with liquid nitrogen. The percentage difference in diameters can be about 10 percent. Thereafter, plug-like members 112 and 114 are installed in the ends of tubular membrane element 14' and as such members warm to ambient temperature, the same expands to produce a hermetic seal within the ends of tubular membrane element 14'. Additionally, each of the bores 120, 122 and 124 are all sized smaller than the associated electrical feed throughs 52 and 54 and the outlet 56. After installation and warming of the plug-like members 112 and 114, the electrical feed throughs 52 and 54 and the outlet 56 are forced through the smaller bores to create hermetic seals. Thereafter, the ends are filled with the deposits of ceramic adhesive 116 and 118 to complete the end seals.

As could be appreciated, the end seal of plug-like elements 112 and 114 and a retaining means, such as a deposit of ceramic adhesive could be used in any electrically driven tubular oxygen separation element. For example, it is possible to fabricate such elements so that the same are closed at one end. In such case, only a single sealed electrical feed through and outlet conduit would penetrate such end seal. Further where the electrically driven tubular oxygen separation element were fabricated so as to be open at both ends, such an end seal could be used to seal one of the ends thereof and as such would consist of a plug-like element that would appear virtually the same as for example, plug-like element 112 without bore 120 and a deposit of ceramic adhesive.

Although the present invention has been described with reference to a preferred embodiment, as will occur to those skilled in the art, numerous changes, additions and omission may be made without departing from the spirit and scope of the present invention as set forth in the appended claims.

We claim:

1. A tubular membrane element for electrically driven oxygen separation, said tubular membrane element comprising:
    an anode layer;
    a cathode layer;
    an electrolyte layer located between the anode layer and the cathode layer;
    two current collector layers located adjacent to and in contact with the anode layer and the cathode layer and situated on the inside and outside of the tubular membrane element to allow an electrical potential to be applied by a power source to induce oxygen ion transport through the electrolyte layer from the cathode layer to the anode layer;
    end seals located at opposite ends of the tubular membrane element, each of the end seals comprising a plug-like member located within the tubular membrane element and formed by an elastomer to produce a hermetic seal and means for retaining the plug-like member within the tubular membrane element;
    at least one sealed electrical feed-through penetrating at least one of the end seals
    a set of electrical conductors passing through the at least one sealed electrical feed-through and in electrical contact with one of the two current collector layers situated on the inside of the tubular membrane element and connected to the other of the two current collector layers situated on the outside of the tubular membrane element; and
    an outlet tube penetrating the one of the end seals or the other of the end seals to allow oxygen to be discharged from the tubular membrane element.

2. The tubular membrane element of claim 1, wherein the retaining means is a deposit of a ceramic adhesive located within the tubular membrane element adjacent to the plug-like member and positioned to prevent outward movement of the plug-like member.

3. The tubular membrane element of claim 1, wherein:
    the at least one sealed electrical feed-through is two opposed sealed electrical feed-throughs penetrating the end seals;
    the outlet tube penetrates the one of the end seals;
    the set of electrical conductors comprises a first pair of the electrical conductors connected to two spaced central locations of the other of the two current collector layers situated on the outside of the tubular membrane element and a second pair of the electrical conductors passing through the two opposed sealed electrical feed throughs, and
    a current distributor of elongated configuration is located within each of the tubular membrane elements, extends between the ends of the tubular membrane element, contacts the one of the two current collector layers situated on the inside of the tubular membrane element and is connected, at opposite ends, to the second pair of the electrical conductors.

4. The tubular membrane element of claim 3, wherein the current distributor is of helical configuration.

\* \* \* \* \*